United States Patent [19]

David

[11] Patent Number: 4,560,473

[45] Date of Patent: Dec. 24, 1985

[54] MACERATOR-DECANTER

[76] Inventor: Constant V. David, 4952 Field St., San Diego, Calif. 92110

[21] Appl. No.: 644,794

[22] Filed: Aug. 27, 1984

[51] Int. Cl.$^4$ .............................................. B01D 11/02
[52] U.S. Cl. ................................... 210/173; 210/244; 210/250; 241/79; 422/276
[58] Field of Search ............... 210/173, 174, 469, 464, 210/465, 473, 474, 477, 250, 244–246, 515; 422/267, 276; 241/76, 79, 42, 72

[56] References Cited

U.S. PATENT DOCUMENTS

| | | | |
|---|---|---|---|
| 550,033 | 11/1895 | Wheeler | 422/267 |
| 2,170,411 | 8/1939 | Jacobs et al. | 210/515 |
| 2,339,453 | 1/1944 | Bidwell | 210/174 |
| 2,365,269 | 12/1944 | Hill | 210/474 |
| 3,221,878 | 12/1965 | Brett | 210/250 |

Primary Examiner—John Adee

[57] ABSTRACT

A specially shaped vessel containing a mixture of solid matter and liquid in which fresh liquid and fresh solid matter are introduced at one end and the processed liquid and solid matter are extracted at the other end. When such a vessel stands, both ends act as the two sides of a communicating vessel arrangement. The liquid levels are always the same on both sides of said vessel. Liquid is poured out from only one end through a spout equipped with a strainer to prevent the solid matter from leaving the vessel. Both ends are covered by a separate lid. To add fresh liquid and solid matter and to extract steeped solid matter, the lid covering the proper end is taken off, while the vessel is standing. To pour liquid fully processed, the lids are left in place, but the outlet lid needs only be turned slightly. As needed, both fresh liquid and solid matter to be steeped are introduced through the inlet end. As liquid and solid matter are extracted and as fresh liquid and fresh solid matter are added, always in the same direction, the mixture of liquid and solid matter, said solid matter thus macerating in said liquid, slowly works its way from the filling end to the extracting end of the vessel. As the vessel contents rest, between periods of either filling or extraction, the liquid remains still and undisturbed, thus being given the opportunity to decant. Depending upon the degree of maceration desired, the natures of the liquid and of the solid matter, the size of the vessel and the rate at which steeping takes place, the ideal rate of extraction is established. If and when used for only one type of liquid and of solid matter, the macerator-decanter can operate without interruption continuously for ever. The quality and characteristics of the extracted products, both liquid and solid matter, are thus automatically caused to remain consistently the same and at their optimum ideal conditions, once established.

14 Claims, 6 Drawing Figures

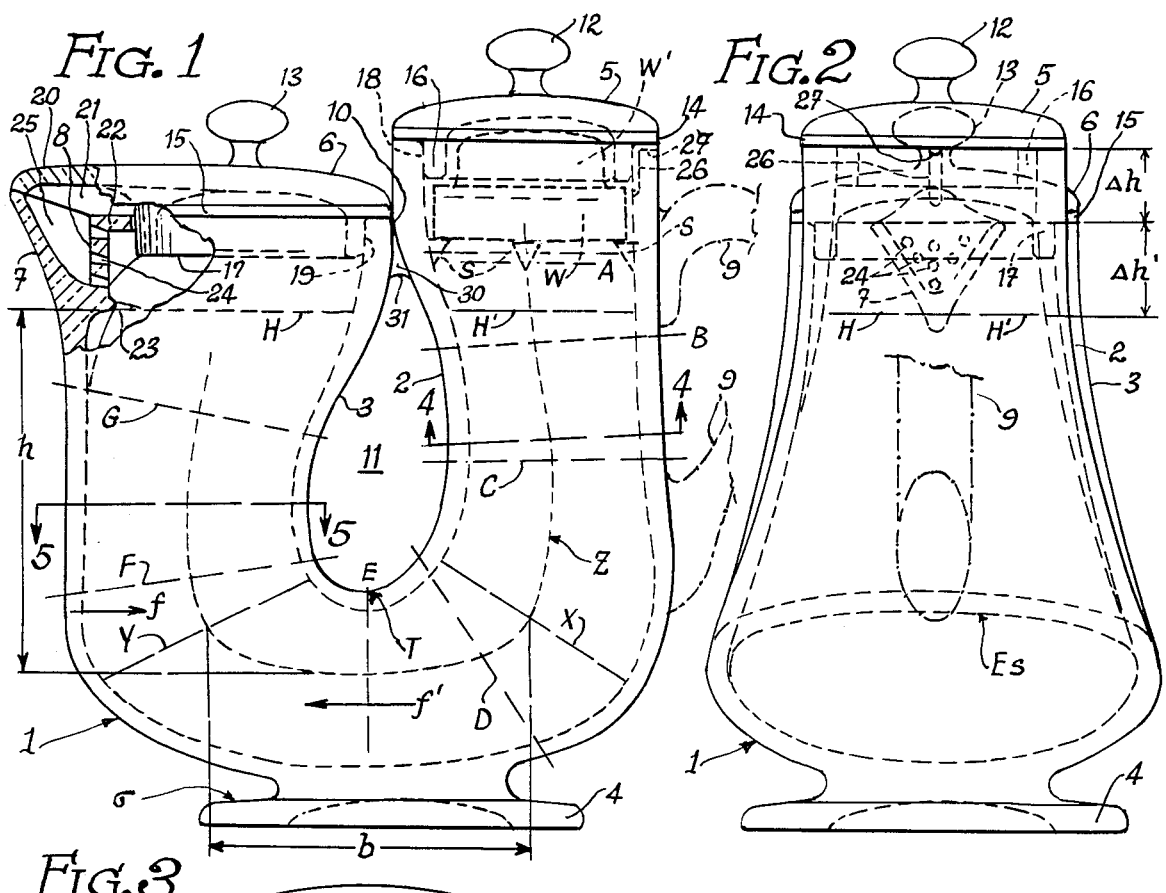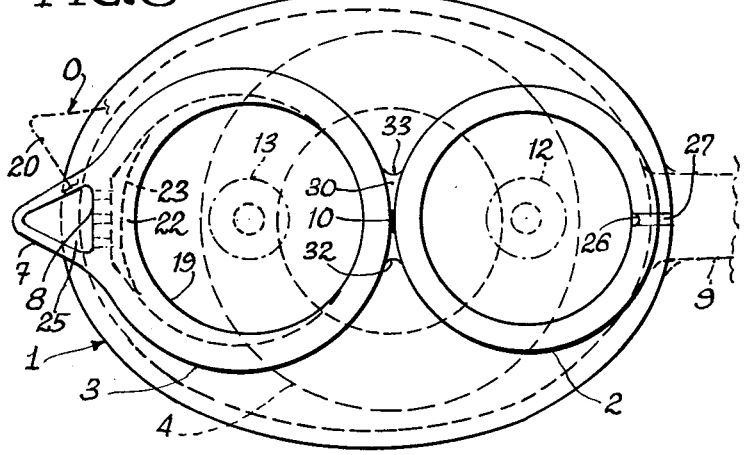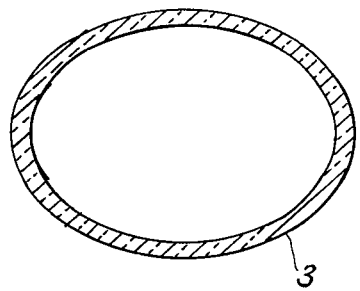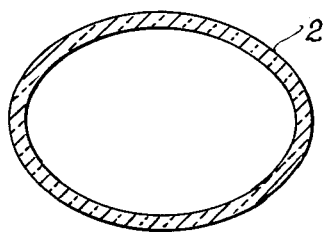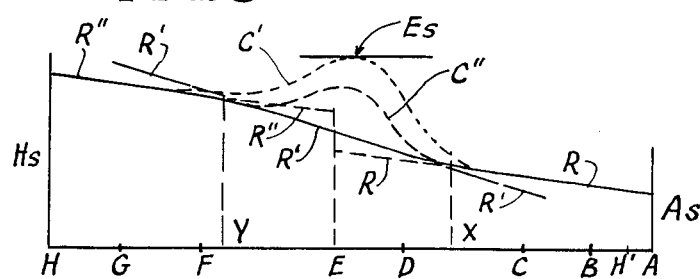

MACERATOR-DECANTER

BACKGROUND OF THE INVENTION

From times immemorial, man has steeped solid matter in liquids, either to have the liquid selectively affect the solid matter or vice versa, and sometimes both. Usually, the liquid and the solid matter are placed in a vessel, which at times itself participates to the maceration process, and left to interact for a set length of time under specified conditions. When the maceration process has reached the stage deemed best and final, either component or both are extracted, either altogether at once or as needed, until the vessel is empty. Then the vessel is cleaned and readied for use once more. Very seldom is it advisable and proper to add more liquid and/or solid matter at any time after the steeping process is initiated. In such instance, one refers to this as a batch process in our modern times. Such an approach to maceration is quite limitative in terms of both production continuity and product quality consistency.

The types and natures of the liquids in which solid matter is steeped are numerous and varied. The types, natures and combinations thereof of solid materials used to affect the liquids in which they are caused to steep are even more numerous and varied. The end results and their uses were and still are a significant part of fields of human endeavors such as medicine (internal and external), cooking, eating and drinking for enjoyment and pleasurable gratification.

Because many households have different needs and tastes, and wish to utilize some of the products that they use or consume in specific ways to satisfy fully such needs and tastes, and because these might prove to be either to expensive or not even practically possible, many such households simply are prevented from producing their own special ingredients. The rate of consumption of such special ingredients on a household scale is also small. Batch processing of the components required to produce such special ingredients is most likely too cumbersome, inefficient and inadequate, thus resulting in waste and the likelihood of lower quality products being thus obtained.

SUMMARY OF THE INVENTION

It is therefore a primary object of the present invention to provide a macerator-decanter that can operate continuously in an uninterrupted manner, simply and reliably.

It is another object of the present invention to provide a macerator-decanter that is small in size for use in households.

It is still another object of the present invention to provide a macerator-decanter that has two distinct openings, one for filling the vessel and the other for extracting products.

It is still another object of the present invention to provide a macerator-decanter that allows the easy separation and segregation of the liquid from the solid matter therein, at the time said liquid is extracted.

It is still another object of the present invention to provide a macerator-decanter that facilitates the decanting of the liquid therein and minimizes its degree of roiling action when it is poured out of the vessel.

It is still another object of the present invention to provide a macerator-decanter that renders the progression of the solid matter from the filling end to the extracting end easy and automatic.

Accordingly, the present invention provides a macerator-decanter vessel that is small and efficient, can operate uninterruptedly to produce macerated solid materials and liquid in which said solid matter has been steeped, that can be extracted separately and which are of consistent quality for use and/or consumption in households.

DESCRIPTION OF THE DRAWINGS

FIG. 1 is a side elevation view of a macerator-decanter.

FIG. 2 is a back elevation view of a macerator-decantor.

FIG. 3 is a top view of a macerator-decanter shown with its lids removed.

FIG. 4 is a sectional view of the filling side of the macerator-decanter taken along section line 4—4 of FIG. 1.

FIG. 5 is a sectional view of the extraction side of the macerator-decanter taken along section line 5—5 of FIG. 5.

FIG. 6 is a graphical diagram showing the cross-sectional areas of the vessel of FIG. 1 at various stations along the path followed by the vessel contents in their progression.

DETAILED DESCRIPTION OF THE INVENTION

Referring to FIGS. 1, 2 and 3, the macerator-decanter generally comprises a U-tube shaped vessel body 1 formed by the two sides 2 and 3 of the U-tube, a foot 4, two lids 5 and 6 and a pouring spout 7 equipped with a straining wall 8. Depending upon the size and particular proportions of the vessel, side 2 may be fitted with a handle 9 shown in phantom lines, being optional. The two sides 2 and 3 are joined at the top at the tangency point 10 and communicate at the bottom to form a communicating-vessels assembly. In order to ease the passage of the solid matter contained in the vessel and being steeped from side 2 to side 3, this passage is caused to follow a curved path having as large a curvature as possible. This is done by separating side 2 and side 3 by a hollow opening 11. As the vessel size and proportions warrant, if handle 9 is not provided, the vessel can then be held by grasping the neck of side 2. Opening 11 thus allows the closing of the thumb and or the other fingers of a hand, providing the firm grasp needed to lift and tilt the macerator-decanter for pouring the liquid out of side 3.

Both lids 5 and 6 are each equipped with a rotund protuberance 12 and 13 respectively, a lip 14 and 15 respectively, and a short cylindrical insert 16 and 17 respectively, which snugly fit in bores 18 and 19 of sides 2 and 3 respectively. Lid 6 is also equipped with an extra hollow side appendage 20 which covers spout 7 when properly set. Cavity 21 inside appendage 20 is isolated from the internal volume of side 3 by top wall 22 which is part of bore 19. A curved protrusion 23 prevents solid matter from easily accumulating in front of strainer wall 8 so that the strainer holes 24 remain fully open. These holes are conically shaped so as to open up into cavity 25 of spout 7, thereby making their cleaning easier and their clogging more difficult. Side 2 top is provided with two small channels 26 and 27 cut into the wall of the vessel top, so that air can easily either escape or flow into vessel 2 as the need arises. To pour liquid out of the macerator-decanter, lid 6 is first slightly rotated in either direction so that appendage 20 assumes a position such as O (FIG. 3). To add fresh liquid and/or solid matter to be steeped, lid 5 is removed, thereby providing access to the top part of side 2. To extract macerated solid matter, lid 6 is lifted, thus permitting access to the top part of side 3.

Referring now to FIGS. 4 and 5, the shapes and dimensions of typical cross-sectional areas of sides 2 and 3 are illustrated. These sections correspond to the midway locations of sides 2 and 3 respectively. The internal area of section 5—5 is larger than that which corresponds to section 4—4. This cross-sectional area variation is shown in FIG. 6, where the area values are plotted as a function of the distance between the top of side 2 and the top of side 3, following path Z which represents the locus of the centers of any and all cross-sectional areas such as 4—4 and 5—5. To facilitate the flow of the solid matter along path Z, with the minimum of resistance, these areas increase as the flow progresses. Such movement takes place whenever fresh solid matter is added at the top of side 2 and/or extracted at the top of side 3.

At the top of both sides 2 and 3, the collar walls formed between bores 18 and 19 and the external surfaces of the vessel are joined by a substantially-sized joint 30 bounded by fillets 31, 32 and 33. This joint provides additional rigidity to the vessel and prevents the generation of stresses at points such as T at the bottom of opening 11.

DISCUSSION AND OPERATION

Three general classes of liquids are generally used as macerating fluids. These three classes can be identified by the density of the major component of that liquid: water, oil or alcohol. Usually, water is the major component of vinegar and/or of fruit juices, fermented or unfermented. Alcohol is practically half water and half pure alcohol. Most solid matters to be steeped have a density either slightly lower, equal to or slightly higher than that of water. As a general rule, most solid materials thus sink in alcohol (liquid with the lowest density), some may float or sink in oil (but mostly sink), and many float on water (if slightly porous). Also, the maceration process and its type affect the density of the solid matter chunks, either increasing or decreasing their density in the process. To keep this discussion general in nature and applicable to all cases, two features are provided in the construction and operation of the macerator-decanter: (1) the top of side 2 (filling side) is higher than the top of the extraction side 3 by $\Delta h$; and (2) a weight W, shown in phantom lines in FIG. 1, can be added on the top of the solid matter at the top of side 2. With these two provisions, it is assumed, hereinafter, that solid matter is continuously pushed out of side 2 into side 3, because of the differential head $(\Delta h + \Delta h')$ that is constantly applied on side 2.

Weight W can only be pushed down to stops S that jut out inwardly from the surface of bore 18, so that its jamming further down in prevented. When weight W rests on these stops, it no longer applies pressure on the material in side 2, but it prevents it from floating above the free surface of the liquid in side 2 and forces it to steep. Based on the well known principle of communicating vessels, as long as the vessel bottom volume is not packed solid, the liquid free surface levels are the same on both sides, H and H'. Weight W can be pushed upon or lifted by means of appendage W'. It can be pushed directly manually or by pushing lid 5 in place. Weight W can be made out of glass or any other suitable material denser than water. Solid matter on side 3 can be raised above level H without altering the liquid levels, as long as the solid matter is relatively free to move. Because of the degree of friction involved in such a motion, however, the apparent density of the liquid is not affected by the presence of the solid chunks of matter. Special removable appendages affixed onto the bottom face of weight W, can also be used to force fresh solid matter below the level of stops S, as required, to entice the body of solid matter to slide down.

Because the normal operation of the macerator-decanter depends upon the solid matter motion remaining unhampered along path Z, especially where such path curves, only chunks of matter that retains its consistency during the macerating process can be steeped. Also, as the solid matter slowly finds its way along path Z, when fresh solid matter is added at the top of side 2, provisions must be made to insure that chunks of matter are not easily stopped. The quality, for any given taste, of the products extracted at the top of side 3 is best when the degree of maceration is uniform for both liquid and solid matter. This can be achieved by facilitating the passage of the solid matter and keeping the relative motion of all the chunks uniform and with the minimum of physical interactions. This is done by enlarging the successive sections of the vessel through which these solid chunks must pass. If the path were straight and these sections had similar shapes, a small constant rate of enlargement would then be proper from one end to the other. However to give more stability to the vessel and to give its proportions more pleasing to the eyes, and to increase its internal capacity without making it too tall, the bottom part is caused to swell in the regions where path Z exhibits its greatest degree of curvature, as illustrated in FIG. 2, which represents a good design compromise. These two construction features then combine to cause a deviation from the ideal ideal section enlargement rate earlier mentioned.

As depicted diagrammatically in FIG. 6, three distinct regions or portions of path Z must be considered. These regions are identified in FIG. 1, starting with A at the inlet and ending with H at the outlet. From A to X, the rate of enlargement is constant. From X, where the bulk of path Z curvature is initiated, to Y, where the bulk of path Z curvature ends, the rate of enlargement R', if the bottom swelling is ignored for the time being, is higher than R. From Y to H it decreases to R", R" being either equal to or slightly greater than R to account for the possible softening of the solid chunks. Theoritically, R' is much larger than R or R", because, as the solid matter turns, its chunks must rearrange their relative positions tridirectionally, which causes additional "friction" and necessitates either additional pushing or a higher opening rate of the path sections. The solid line of FIG. 6 thus represents this ideal theoritical situation in which the swelling of the vessel bottom is not yet considered. Actual section Es (taken along plane E perpendicular to FIG. 1 plane) as shown in FIG. 2 is obviously much larger than section 4—4 or even section 5—5 which is located downstream of section Es.

At this point, a distinction must be made between different constructions of various macerator-decanters, depending upon their intended uses: i.e. the natures of the liquid and of the solid matter. For mixtures that flow easily, e.g. garlic cloves in olive oil, the highest degree of swelling which corresponds to curve C' of FIG. 6 could be quite acceptable. Curve C" represents an intermediate degree of swelling, satisfactory for garlic cloves in vinegar for instance. Each degree of swelling, ideally, thus corresponds to specific mixtures characterized by specific flowing abilities. For optimum usage of the maceratordecanter, a specific degree of swelling is indicated by an indicium displayed at location $\sigma$ on the upper surface of foot 4, so that the user knows the category of macerating mixtures that can be best handled by the class of macerator-decanter identified by the indicium displayed. the indicium can be located at any other easily visible side on the vessel. A guiding table can be compiled to show the combinations of liquid and solid matter that are best handled by any and all specific degrees of swelling, referred to as sizes. Only a few such sizes, five or less, covers the full gamut of all such practical combinations. It is worthwhile pointing out that the size does not refer to the internal capacity of the vessel, but to the various ratios Hs/As, Es/Hs expressed per unit length of path Z, which essentially determines the rate at which the vessel opens up at various sections along the path that the solid matter must follow. The smallest size corresponds to a macerator-decanter configuration that exhibits no swelling (theoritical curve in solid line of FIG. 6) and is most applicable to mixtures such as chunks of soft fruits and alcohol, as an example.

The mixture must travel a total average vertical distance of 2h, h on the way down and again h on the way up. Horizontally, it must travel an average distance b. All solid chunks do not travel the same total distance, as is obvious from examining FIG. 1, to go from A to H. This is why they must rearrange their relative positions tridirectionally as earlier mentioned. Whenever path Z is quasi straight, if the section areas increase and the section shapes change, the rearrangement of position needed of the chunks is bidirectional. If the chunks traveled in a slightly conical tube with circular sections, the chunk position rearrangement would be unidirectional, in theory. In a straight circular tube, no rearrangement is required. When some rearrangement is required, the relative movements of the chunks generate internal friction, referred to earlier as "friction". The term does not refer to the friction of the chunks against the vessel walls, which is minimal and can be ignored. However, this internal friction can cause two unwanted phenomena: (1) the bunching up and local packing of the chunks (clogging); and (2) the concomitant increase of the pressure needed to be applied at the top of side 2, on fresh chunks. In the present application, an increase of pressure would result in damage inflicted to the chunks, which is not advisable, and possibly a worsening of the clogging condition. Manipulation of the chunks from the outside, except through weight W, is to be avoided as it may also lead to more damage to the chunks. However, indirect manipulation of the chunks as a whole can be beneficial and is generally harmless. The vessel can be shaken as a whole in a preferential direction so as to impart momentum to the bulk of the solid mater residing in the bottom part of the macerator-decanter, to force it gently to move forward. Such externally applied manipulation, if properly performed, prevents clogging from starting. First, it should be mentioned that most of the horizontal portion of path Z is almost straight on a length of almost b/2. When the vessel rests on a flat surface, after some liquid has been poured (or solid matter extracted) out of side 3 and when lid 6 has been reset to close the top of side 3, if a shock is given by the user with the palm of one hand while holding the vessel with the other hand, in the direction of arrow f shown in FIG. 1, the inertia of the chunk mass and liquid causes the mixture to move in the direction of arrow f'. The chunks contained in the vertical portion of side 3 are also caused to move sideway, thereby loosening them and easing their motion upward, as a response to the solicitation received from the bottom mass. Such external indirect manipulation of the solid matter chunks is most effective and least damaging to the chunks. If judiciously applied, it is sufficient and adequate to keep the flow of mixture moving any time fresh solid matter is added and/or macerated solid matter is removed.

To obtain the optimum degree of maceration, according to the requirements of each specific mixture combination, it is necessary to extract both liquid and solid, and to add both fresh liquid and solid in the proper ratio and at the recommended time frequency. Because both liquid and solid move in unison, fresh liquid and solid are always together, as are macerated solid matter and fully processed liquid. This happens to be the way most macerating processes proceed when done by batches, in one jar or barrel. The quality of the products processed by a macerator-decanter should therefore be comparable to that which are obtainable with the best batch maceration processes.

The walls of the vessel should be transparent so that the progression, or lack of it, of the solid matter and the liquid levels are apparent. Glass or hard transparent plastic material are both good candidate materials. In the regions of the vessel where path Z curvature is most pronounced, spot teflon coating of the internal surface of the vessel wall can be used to ease the sliding of the solid chunks, where the degree of tridirectional repositioning of the chunks is most critical. Although most of the friction to overcome is not generated by this sliding, easier sliding of the chunks in contact with the vessel wall can only be beneficial. If the macerator-decanter is used properly, no liquid or no solid matter is given the opportunity to stagnate for long time periods at any location inside the vessel, provided that processed products are steadily extracted as needed. Only care needs be taken that the solid matter chunks do not break down and remain mostly intact until they are ready for extraction. Such care insures that the flow of the liquid around these chunks remains unhampered and free at all times. The shaping, sizing and selecting of the solid matter nature and texture should be done according to the nature of the steeping liquid, the macerator-decanter size and the user's instructions. If such instructions are properly followed, an uninterrupted and continuous usage of the macerator-decanter for very long periods of time is thus possible.

The various embodiments of the present invention discussed above then result in a vessel that provides the means for steeping chunks of solid matter in liquids, in a manner such that both the steeping and steeped products can be extracted easily and separately while the bulk of the macerating mixture is left undisturbed. The addition of fresh products into the macerator-decanter can also be achieved with a minimum amount of roiling of the decanted liquid, soon to be poured out, and in a manner such that all fresh products already at various stages of maceration are all forced to follow an identical path and process. The solid particles from the decanting process mostly come to rest on the solid chunks and are extracted with them. A judicious and ideally proportioned combinations of the construction features available with these various embodiments provides the means for achieving such results.

Having thus described my invention, I now claim:

1. A macerator-decanter vessel comprising:
   means for introducing fresh steeping liquid and fresh solid matter to be steeped, in lump form, at one inlet end of a double-ended curved vassel;
   means for extracting the processed steeping fluid at the other end of said vessel, said end being the outlet end;
   means for separating said liquid from the steeped solid matter at the outlet end of said vessel;
   means for allowing the direct extraction of the processed steeped solid lumpy matter at the outlet end of said vessel;
   means for containing and storing the mixture of liquid and solid matter while the maceration and decanting processes take place inside said vessel;
   means for facilitating the automatic progression of the liquid and solid mixture from the inlet end to the outlet end, as the maceration and decanting processes take place, each time fresh solid matter is added and each time fully steeped solid matter is extracted, said solid matter progression being always substantially in the same direction, from inlet to outlet; and
   wherein: (1) the inlet end and the oulet end are circularly shaped and tangentially joined together in a manner such that the vessel centerline substantially completes a 180-degree turn from one end to the other; (2) both inlet and outlet ends are closed by means of removable lids; (3) the lower midsection portion of the vessel includes a footing platform, thereby enabling the vessel to stand vertically on a substantially horizontal surface; (4) an opening is provided between the vessel lower portion and both sides of the U-shape so formed by the vessel centerline 180-degree turn, lessening thereby the degree of curvature of the vessel lower portion and vessel bottom and providing grasping means of the vessel with one hand, also thereby increasing the degree of stability of the vessel by lowering its center of gravity; and (5) the cross-sectional areas of the vessel internal volume progressively augment in size, from the inlet end to the outlet end, thereby providing means for facilitating the progression of the solid matter on its way from the inlet end to the outlet end.

2. A macerator-decanter vessel according to claim 1 wherein the shapes of said cross-sections vary gradually from circular at the inlet end to quasi elliptical at the vessel bottom, then from said quasi elliptical shape at said vessel bottom back to a circular shape at the outlet end, thereby further widening the opening located in said vessel midsection and further lessening the degree of curvature of the mean path followed by the solid matter in its progression forward.

3. A macerator-decanter vessel according to claim 2 wherein said vessel substantially consists of three main distinct sections: a substantially horizontal bottom section connected to two quasi vertical sections, the bulk of the vessel body curvature thus being substantially located in two distinct regions, each providing substantially half of the total vessel curvature and each forming a transition section between said three main distinct sections.

4. A macerator-decanter vessel according to claim 2 wherein the cross-section areas of said transition section leading to the bottom section of said vessel augment in size at a rate higher than the rates which characterize the enlargement of the two quasi vertical sections, thereby facilitating the solid matter progression through said transition section.

5. A macerator-decanter vessel according to claim 2 wherein the cross-section areas of the bottom section of said vessel do not augment substantially and even may decrease toward its exit part, thus causing said bottom section, however, to provide a larger proportion of said vessel total capacity and enhancing its stability.

6. A macerator-decanter vessel according to claim 1 wherein the cross-section areas of the transition section located between said vessel bottom section and the quasi vertical section leading to the outlet end of said vessel resume the gradual sectional area enlargement which further progresses into said vertical section, into which it leads, thereby facilitating the passage of the solid matter from the bottom section into the outlet side vertical section.

7. A macerator-decanter vessel according to claim 1 wherein the cross-section areas of the outlet side vertical section augment at a rate substantially equal to that which characterizes the rate of enlargement of the inlet side vertical section.

8. A macerator-decanter vessel according to claim 1 wherein the vessel internal configuration is shaped, dimensioned and arranged in a manner such that a brusque unidirectional shaking applied to said vessel horizontally in the direction of the centerline of the vessel bottom section, opposed to the direction of natural progression of the solid lumpy matter, causes a loosening of all said solid matter inside said vessel and, because of inertia, imparts momentum to said solid matter residing in the vessel bottom section, thereby overcoming the internal friction of the vessel solid content and causing it to progress forward, whenever such shaking action is applied.

9. A macerator-decanter vessel according to claim 1 wherein a cylindrically shaped weight, free to move, is positioned between the lid covering the vessel inlet opening and the top of the solid matter that resides in the inlet side of said vessel, and whereby:
   means is provided for stopping said weight, thereby limiting its free vertical travels and preventing said weight from jamming inside said vessel;
   means is provided for lifting, holding and handling said weight when located inside and outside of said vessel; and
   means is provided for pushing said weight down to its stops by means of the appurtenant opening lid.

10. A macerator-decanter vessel according to claim 1 including:
    means for easily pouring the processed liquid out of said vessel outlet side without disturbing the solid matter inside said vessel and with a minimum amount of liquid roiling, thereby minimally affecting the decanting process then taking place inside the macerator-decanter;
    means for straining said liquid as it exits said vessel; and
    means for retaining the solid matter inside the volume underneath the lid, thereby preventing it from entering the volume located behind the straining means and mixing with the liquid being poured.

11. A macerator-decanter vessel according to claim 1 including:

means for allowing air to enter and leave freely the vessel space under the inlet lid, thereby facilitating the pouring of the processed liquid out of the vessel outlet side;

means for fully closing the outlet opening, when needed; and means for opening the outlet side of the vessel without removing the lid off the outlet opening whenever processed liquid is being poured out of the outlet side of said vessel, thereby preventing any solid matter therein from escaping.

12. A macerator-decanter vessel according to claim 5 wherein the degree of enlargement of the vessel bottom section can be caused to vary between macerator-decanters of equal total capacity but characterized by a different size appellation, said size appellation being indicated on the macerator-decanter vessel body at a location easily identifiable and highly visible by an indicium, thereby establishing categories of sizes of macerator-decanter, whereby the size most suitable for the processing of specific combinations of steeping liquids and of solid matter to be steeped can then readily be selected by the user of a macerator-decanter.

13. A macerator-decanter vessel according to claim 12 wherein:

means is provided for facilitating the observation of the motion and condition of the lumps of solid matter and the levels of the steeping liquid;

means is provided for locally facilitating the sliding of said lumps of solid matter against the vessel walls; and means is provided for lessening the possibility of said lumps of solid matter to cluster and thereby of clogging sections of the macerator-decanter vessel.

14. A macerator-decanter vessel according to claim 8 wherein:

means is provided for macerating lumps of solid matter in liquids;

means is provided for decanting said liquids;

means is provided for extracting the decanted products with the lumps of steeped solid matter;

means is provided for operating said macerator-decanter in a continuous and uninterrupted manner for long periods of time, appreciably much longer than the maceration process duration; and means is provided for producing liquid and solid components and ingredients which have interacted in a steeping process and which are consistent in quality and generally exhibit similar physical characteristics continually, as the macerator-decanter is being used and whenever it is utilized at the production rate best suited for any specific mixture of fresh liquid and fresh solid materials.

* * * * *